United States Patent
Kennis et al.

(10) Patent No.: US 7,961,341 B2
(45) Date of Patent: Jun. 14, 2011

(54) PRINT SYSTEM, PRINT DATA SUPPLYING DEVICE, AND METHOD FOR SUPPLYING PRINT DATA TO PRINTER

(75) Inventors: Albert Kennis, Shizuoka (JP); Kenichi Gomi, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 1061 days.

(21) Appl. No.: 11/616,355

(22) Filed: Dec. 27, 2006

(65) Prior Publication Data

US 2007/0146761 A1 Jun. 28, 2007

(30) Foreign Application Priority Data

Dec. 28, 2005 (JP) ................. 2005-377679

(51) Int. Cl.
*G06F 3/12* (2006.01)
*G06K 15/00* (2006.01)
(52) U.S. Cl. ............................... 358/1.15; 358/1.13
(58) Field of Classification Search .................. 358/1.1, 358/1.9, 1.13, 1.14, 1.15, 1.18, 448; 705/16
See application file for complete search history.

(56) References Cited

U.S. PATENT DOCUMENTS

| | | | |
|---|---|---|---|
| 5,748,861 A * | 5/1998 | Kashiwazaki et al. | 358/1.11 |
| 6,415,341 B1 | 7/2002 | Fry, Sr. et al. | |
| 7,508,535 B2 * | 3/2009 | Hart et al. | 358/1.15 |
| 7,528,976 B2 * | 5/2009 | Hart et al. | 358/1.15 |
| 2004/0030600 A1 * | 2/2004 | Lacroix | 705/16 |
| 2005/0111035 A1 * | 5/2005 | Takamine | 358/1.15 |

FOREIGN PATENT DOCUMENTS

| | | |
|---|---|---|
| CN | 1679058 A | 10/2005 |
| JP | 09-274580 A | 10/1997 |
| JP | 2002-328795 A | 11/2002 |
| JP | 2004013707 | 1/2004 |
| JP | 2004-272684 A | 9/2004 |
| WO | 2004003866 | 1/2004 |

OTHER PUBLICATIONS

European search report dated Apr. 8, 2008.
Chinese Office action for Appl. No. CN 200610170307.1 dated Dec. 25, 2009.
Japanese Office action dated Aug. 3, 2010 for Appl. No. 2005-377679.

* cited by examiner

*Primary Examiner* — Gabriel I Garcia
(74) *Attorney, Agent, or Firm* — Pearne & Gordon LLP (57) ABSTRACT

A print system includes: a printer; and a print data supplying device. The print data supplying device includes: a print data supplying unit that supplies the printer with a print data; an internal print data condition storage unit that stores a plurality of internal print data conditions in association with the respective print data generation processing operations, the internal print data conditions pertaining to the internal print data; a determination unit that determines whether or not the internal print data satisfies any one of the internal print data conditions; and a print data generation unit that generates the print data by performing one of a plurality of print data generation processing operations, in accordance with internal print data that is output as a result of a data processing operation, and in accordance with the result of the determination made by the determination unit.

10 Claims, 7 Drawing Sheets

|  | QUANTITY | UNIT PRICE |
|---|---|---|
| SHOP A | | |
| BANANA | 2 | ¥100 |
| DOG FOOD | 1 | ¥75 |
| APPLE | 4 | ¥50 |
| KIWI FRUIT | 1 | ¥125 |
| TOOTHPASTE | 1 | ¥260 |
| COFFEE | 1 | ¥200 |
| TOTAL AMOUNT | | ¥1,060 |

THANK YOU

| OUTPUT FLOW TYPE OF INTERNAL PRINT DATA | NAME OF INTERNAL PRINT DATA | PRINT DATA GENERATION PROGRAM |
|---|---|---|
| 1 | A | PRINT DATA GENERATION PROGRAM A (CONVERT INTERNAL PRINT DATA OF COMMAND SYSTEM "2" INTO PRINT DATA OF COMMAND SYSTEM "1") |
| 1 | B | PRINT DATA GENERATION PROGRAM B (SUBJECT RECEIPT IMAGE TO PREDETERMINED PROCESSING, AND CONVERT INTERNAL PRINT DATA OF COMMAND SYSTEM "2" INTO PRINT DATA OF COMMAND SYSTEM "1") |
| 2 | B | PRINT GENERATION PROGRAM A |
| 3 | B | PRINT GENERATION PROGRAM C (CONVERT INTERNAL PRINT DATA OF COMMAND SYSTEM "3" INTO PRINT DATA OF COMMAND SYSTEM "1") |

PRINT SYSTEM, PRINT DATA SUPPLYING DEVICE, AND METHOD FOR SUPPLYING PRINT DATA TO PRINTER

CROSS REFERENCE TO RELATED APPLICATION

This application claims priority from a Japanese Patent Application No. 2005-377679 filed on Dec. 28, 2005, the entire subject matter of which is incorporated herein by reference.

TECHNICAL FIELD

The present invention relates to a print system, a print data supplying device, and a method and computer-readable program product for controlling the print data supplying device.

BACKGROUND

A print system which causes a printer to produce a printout of an image generated by an application program has commonly been known. For example, a print system which causes a printer to produce a printout of a sales slip (hereinafter called a "receipt") image generated by a POS (Point Of Sales) application program has hitherto been known.

In the print system, when a printer is replaced with another printer, there sometimes arises a case where a difference is apparent between a printout produced by a pre-replacement printer (a printer employed before replacement) and a printout produced by a post-replacement printer (a printer employed after replacement), because of a difference between specifications of the pre-replacement printer and those of the post-replacement printer. In such case, in order to acquire a printout analogous to the printout of the pre-replacement printer, specifications and settings of the application program must be altered in consideration of specifications of the post-replacement printer.

SUMMARY

According to an aspect of the present invention, there is provided a print system including: a printer; and a print data supplying device. The print data supplying device includes: a print data generation unit that generates print data by performing one of a plurality of print data generation processing operations in accordance with internal print data that is output as a result of a data processing operation; a print data supplying unit that supplies the printer with the print data generated by the print data generation unit; an internal print data condition storage unit that stores a plurality of internal print data conditions in association with the respective print data generation processing operations, the internal print data conditions pertaining to the internal print data; and a determination unit that determines whether or not the internal print data satisfies any one of the internal print data conditions. The print data generation unit generates the print data by performing one of a plurality of print data generation processing operations, in accordance with the result of the determination made by the determination unit.

DETAILED DESCRIPTION

An embodiment of the present invention will be described in detail hereinbelow by reference to the drawings.

Figure 1:
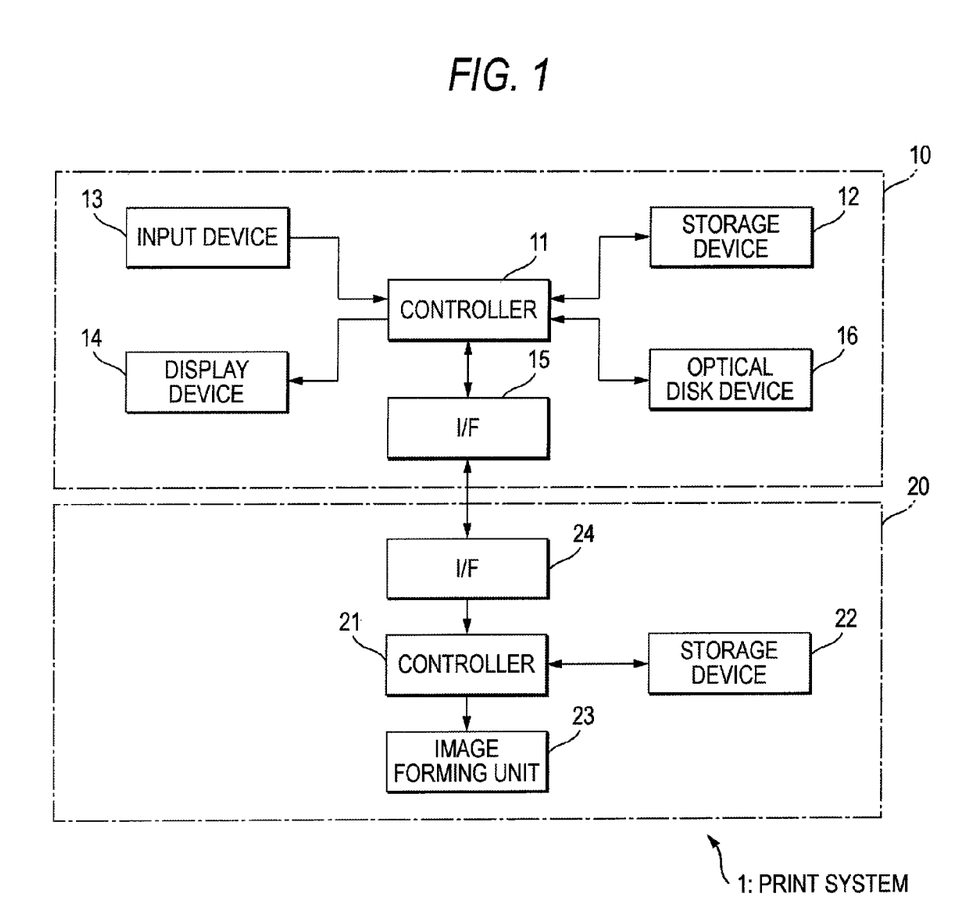
FIG. 1 is a view showing the overall configuration of a print system according to an embodiment of the present invention.

FIG. 1 is a view showing the entire configuration of a print system according to an embodiment of the present invention. As illustrated, a print system 1 of the present embodiment includes a host computer 10 (a print data supplying device) and a printer 20.

As shown in FIG. 1, the host computer 10 includes a controller 11; a storage device 12; an input device 13; a display device 14; an interface (I/F) 15; and an optical disk device 16.

The controller 11 operates according to an operating system and another program, which are stored in the storage device 12, thereby performing various information processing operations. The storage device 12 is formed from a computer-readable information storage medium. For example, the storage device 12 includes ROM (Read-Only Memory), RAM (Random Access Memory), and a hard disk drive. The storage device 12 stores a program executed by the controller 11. The storage device 12 operates also as work memory which stores various sets of data required during the course of processing performed by the controller 11.

The input device 13 is a keyboard, a mouse, or the like, and inputs to the controller 11 the data conforming to an input operation performed by the user. The display device 14 is a display or the like, and displays information in accordance with an instruction input from the controller 11. In accordance with the instruction input from the controller 11, the optical disk device 16 reads a program or data stored in an optical disk (an information storage medium); e.g., a DVD-ROM or the like.

The interface 15 is for connecting various peripheral devices or information storage mediums (memory cards or the like) to the host computer 10. The interface 15 outputs the data input from a peripheral device, or the like, to the controller 11. In accordance with the instruction input from the controller 11, the interface 15 outputs various data to the peripheral device, or the like. The host computer 10 is provided with one or a plurality of connection ports (hereinafter called "USB ports") complying with USB (Universal Serial Bus) interface specifications.

Figure 2:
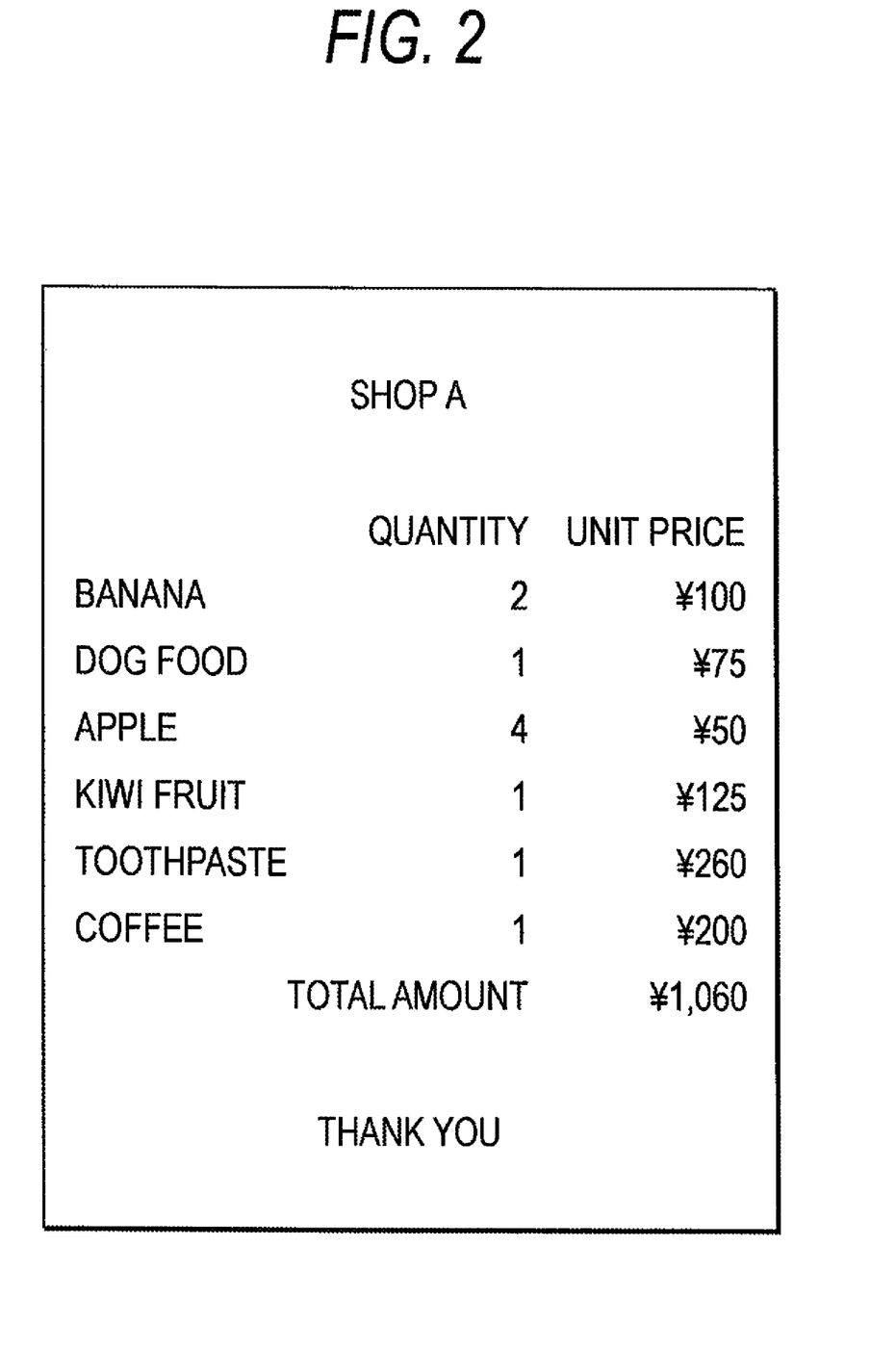
FIG. 2 is a view showing an example receipt image.

In the present embodiment, Windows (Registered Trademark) manufactured by Microsoft Corporation is installed as an operating system in the host computer 10. Further, a POS application program (hereinafter described as a "POS application") is installed in the host computer 10. For example, the POS application has a function of creating a receipt image such as that shown in FIG. 2 and another function of commencing operation for printing the receipt image.

The host computer 10 is connected to the printer 20 by way of the interface 15 so that data can be exchanged between the host computer 10 and the printer. As shown in FIG. 1, the printer 20 includes a controller 21, a storage device 22, an image forming unit 23, and an interface (I/F) 24.

The controller 21 controls the entirety of the printer 20. The storage device 22 includes ROM or RAM, and stores various programs and data, which are required for effecting printing operation. The interface 24 receives the data transmitted from the host computer 10, and outputs the thus-received data to the controller 21. The printer 20 is provided with a USB port, as the interface 24. The image forming unit 23 forms an image, which is based on the data input by the controller 21, on an image recording medium, such as a print sheet or the like.

The printer 20 receives from the host computer 10 command data of a predetermined command format (i.e., print data), and forms an image on an image recording medium in accordance with the command data. In the case of the present embodiment, the printer 20 receives, from the host computer 10, command data showing coloring information about each of pixels forming an image, and generates an image on an image recording medium on the basis of the command data. Moreover, the printer 20 receives, from the host computer 10, another set of command data showing specifics for controlling various mechanisms, and controls the mechanisms in accordance with the command data. For example, when the printer 20 has an automatic cutting mechanism and receives command data instructing cutting of the image recording medium from the host computer 10, and cuts the image recording medium at a given position in a given mode. The command data accepted by the printer 20 are assumed to be command data of "command system 1."

Figure 3:
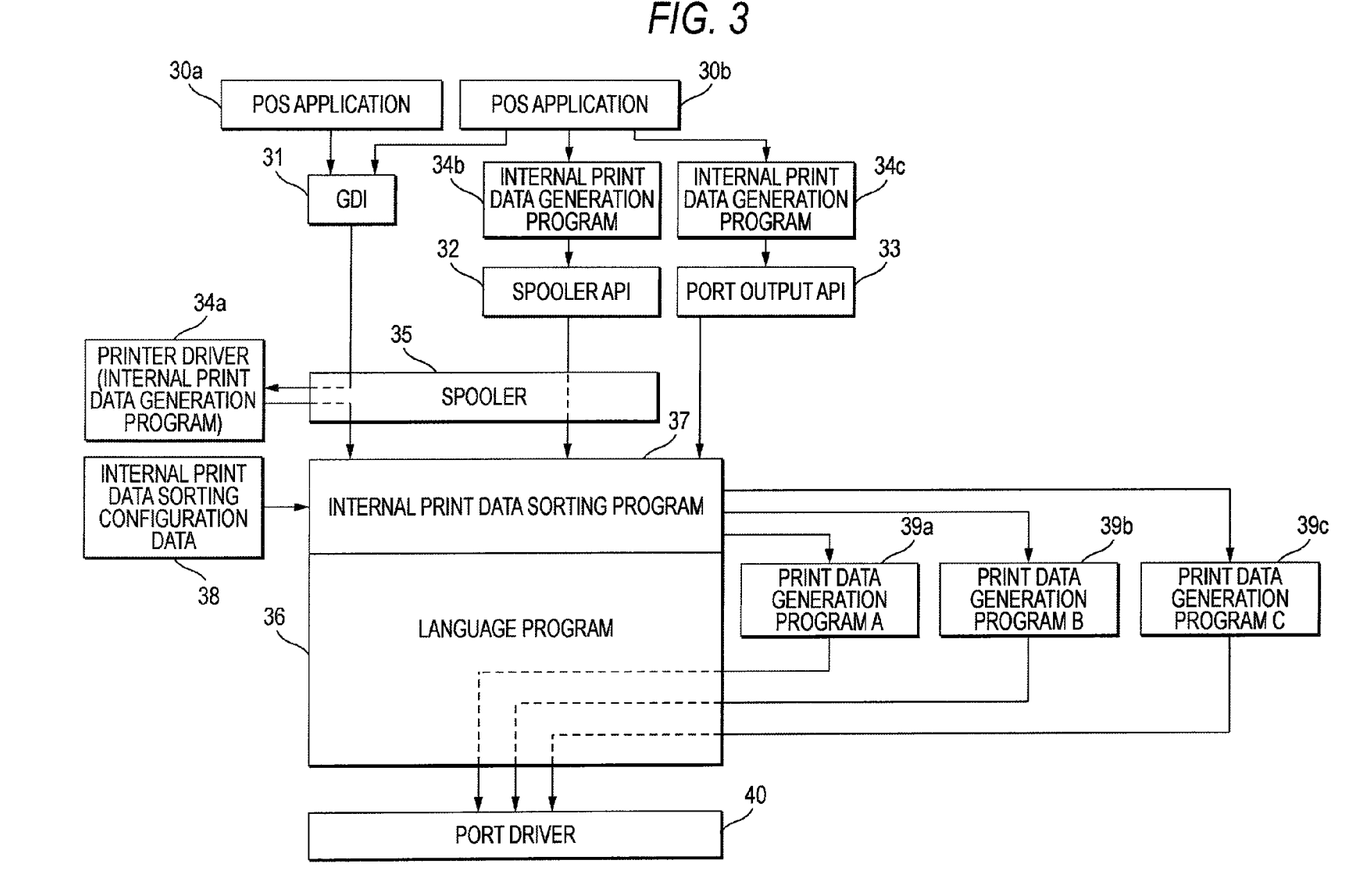
FIG. 3 is a view for describing print processing of a host computer.

Operation of the host computer 10 performed when printing of a receipt image has been instructed will now be described. FIG. 3 is a view for describing example operation of processing performed by the host computer 10. Although a POS application program 30a and a POS application program 30b are provided in the drawing, at least one of the application programs is installed in the host computer 10.

There will first be described a case where the POS application 30a has issued a command to print the receipt image.

When the POS application 30a has issued a command to print the receipt image, various functions of a GDI (Graphic Device Interface) program 31 are activated, as required. This GDI program 31 is a group of functions used for rendering an image and is provided by the operating system.

In this case, a print job is first started, and there are subsequently generated meta data into which a group of GDI commands used for printing a receipt image are recorded. The meta data are not dependent on a device.

When a print job is started, the POS application 30a specifies the designation of the print job. In relation to the name of the print job, a given designation may also be specified for each application, or a different designation may also be specified for each set of image data to be printed. In the case of the present embodiment, a fixed print job name "A" is retained in the POS application 30a. When the receipt image of the POS application 30a is printed, the print job name "A" is specified regardless of the type of a receipt image. The print job name specified by the POS application 30a is retained in association with the print job started by the GDI 31.

The meta data generated by the GDI 31 are supplied to a printer driver 34a associated with the printer 20. The printer driver 34a generates internal print data (RAW data) from the group of GDI commands recorded in the meta data. The internal print data generated herein include command data showing print specifics for each line, command data showing the type of a font, and the like. The internal print data are not limited to command data of an interpretable command system but may be command data of a command system which is uninterpretable for the printer 20. The printer driver 34a herein is assumed to generate, as internal print data, command data of "command system 2" differing from the "command system 1."

The internal print data generated by the printer driver 34a are supplied to a spooler 35. The spooler 35 monitors the status of the printer 20, and outputs the internal print data to a port driver 40.

As mentioned above, when the POS application 30a has instructed printing of a receipt image, the internal print data are output to the port driver 40 via the GDI 31, the printer driver 34a, and the spooler 35.

Next, there will be described a case where the POS application 30b has instructed printing of a receipt image. Three cases are conceived: namely, 1) the internal print data are output to the port driver 40 via the GDI 31, the printer driver 34a, and the spooler 35; 2) the internal print data are output to the port driver 40 via an internal print data generation program 34b, a spooler API (Application Program Interface 32), and the spooler 35; and 3) the internal print data are output to the port driver 40 via an internal print data generation program 34c and a port output API 33.

Of the above three cases, the case where the internal print data are output to the port driver 40 via the GDI 31, the printer driver 34a, and the spooler 35 is the same as the case where the POS application 30a instructs printing of a receipt image. Accordingly, its explanation is omitted. In the case of the present embodiment, the POS application 30b retains fixed print job name "B." When the GDI 31 starts a print job, the name of the print job "B" is specified regardless of the type of the receipt image.

First, there will be described a case where the internal print data are output to the port driver 40 via the internal print data generation program 34b, the spooler API 32, and the spooler 35.

In this case, the internal print data generation program 34b is requested to generate internal print data, and the internal print data generation program 34b generates internal print data (RAW data). The internal print data generation program 34b may also be provided integrally with the POS application 30b or separately from the POS application 30b. The internal print data generated herein are command data showing print specifics for each line, command data showing the type of a font, and the like. Like the internal print data generated by the printer driver 34a, the internal print data are not limited to the command data of the command system interpretable for the printer 20, but may be command data of a command system uninterpretable for the printer 20. The printer driver 34b is herein assumed to generate command data of command system 2 as internal print data.

When the internal print data generation program 34b has generated the internal print data, various functions of the spooler API 32 are activated, as required. The spooler API 32 is a group of functions used for supplying the internal print data directly to the spooler 35 without involvement of the printer driver 34a, and is provided by the operating system.

In this case, the print job is first started, and internal print data are subsequently supplied to the spooler 35. The spooler 35 monitors the status of the printer 20, and outputs the internal print data to the port driver 40.

When the internal print data generation program 34b is requested to generate internal print data, the POS application 30b specifies the name of the print job. The print job name specified by the POS application 30b is retained in association with the print job started by the GDI 31. As mentioned above, in the case of the present embodiment, the fixed print job name "B" is retained in the POS application 30b. When the print job is initiated, the print job name "B" is specified regardless of the type of a receipt image.

Next, there will be described a case where the internal print data are output to the port driver 40 via the internal print data generation program 34c and the port output API 33.

In this case, the internal print data generation program 34c is requested to generate internal print data, and the internal print data generation program 34c generates internal print data (RAW data). The internal print data generation program 34c may also be provided integrally with the POS application 30b or separately from the POS application 30b. The internal print data generated herein are command data showing print specifics for each line, command data showing the type of a font, and the like. Like the internal print data generated by the printer driver 34a and the internal print data generated by the internal print data generation program 34b, the internal print data are not limited to the command data of the command system interpretable for the printer 20, but may be command data of a command system uninterpretable for the printer 20. The internal print data generation program 34c is herein assumed to generate as internal print data command data of command system 3 which differs from the "command system 1" and the "command system 2."

When the internal print data generation program 34c is requested to generate internal print data, the POS application 30b specifies the name of the internal print data. As mentioned previously, in the case of the present embodiment, the fixed internal print data name (print job name) "B" is retained in the POS application 30b. When the name of internal print data is generated, the internal print data name "B" is specified regardless of the type of a receipt image. The name of the internal print data is retained in association with the internal print data.

When the internal print data generation program 34c has generated internal print data, various functions of the port output API 33 are activated, as required. The port output API 33 is a group of functions used for outputting the internal print data directly to the port driver 40 without involvement of the spooler 35, and is provided by, for example, the provider of the POS application 30b, the provider of the printer 20, and the like. As a result of various functions of the port output API 33 being activated as required, the internal print data are output to the port driver 40.

A language monitor program 36 monitors supply of internal print data to the port driver 40. When having detected supply of internal print data to the port driver 40, the language monitor program 36 inhibits supply of the data. The language monitor program 36 provides the internal print data to any of a print data generation program A 39a, a print data generation program B 39b, and a print data generation program C 39c. The language monitor program 36 is also used to receive status information from the printer 20 via the port driver 40 and supply the status information to a predetermined program (e.g., a status reference program and the like).

The language monitor program 36 includes an internal print data sorting program 37. The internal print data sorting program 37 selects a print data generation program to be supplied with internal print data, in accordance with internal print data sorting configuration data 38.

Figure 4:
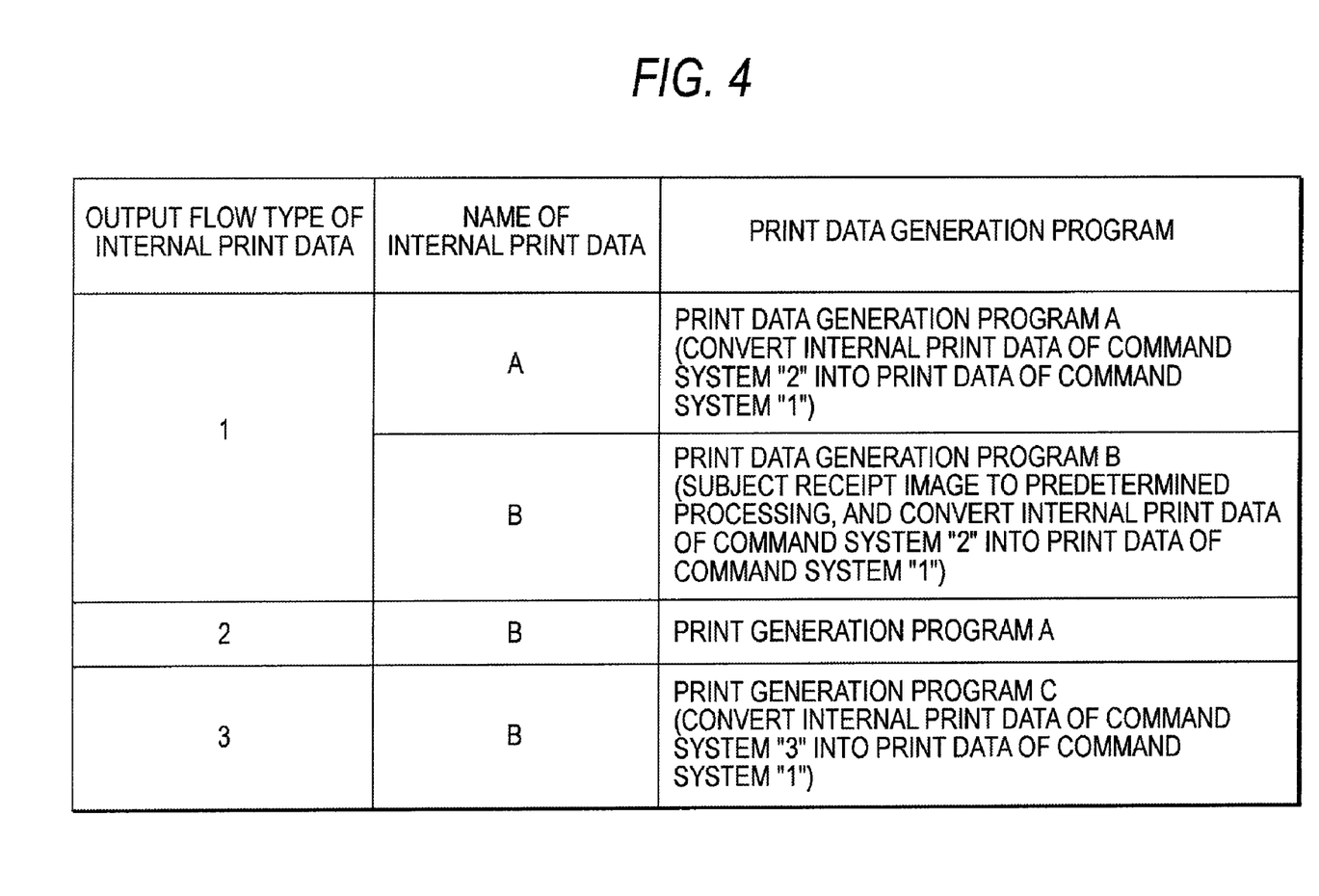
FIG. 4 is a view showing example internal print data sorting configuration data.

FIG. 4 is a view showing example internal print data sorting configuration data 38. In the example shown in the drawing, a combination of the type of an output flow of internal print data and the name of internal print data is associated with a print data generation program. In the drawing, the type of the internal print data output flow shows conditions; namely, the nature of a program which has output internal print data to the port driver 40 (the language monitor program 36). An output flow type "1" shows a case where internal print data have been output to the port driver 40 (the language monitor program 36) via the GDI 31, the printer driver 34a, and the spooler 35. An output flow type "2" shows a case where the internal print data have been output to the port driver 40 (the language monitor program 36) via the internal print data generation program 34b, the spooler API 32, and the spooler 35. Further, an output flow type "3" shows a case where the internal print data have been output to the port driver 40 (the language monitor program 36) via the internal print data generation program 34c and the port output API 33. The internal print data sorting configuration data 38 are stored in the host computer 10 as a file of a text format or an XML (extensible Markup Language) file. Moreover, specifics of the internal print data storing configuration data 38 are edited directly as a result of direct edition of this text file or an XML file. Moreover, for example, the specifics of the internal print data sorting configuration data 38 are also edited by way of a predetermined configuration edition screen (not shown).

When the internal print data have been supplied to the language monitor program 36, the internal print data sorting program 37 specifies the output flow type of internal print data and acquires the internal print data name of the internal print data. When the output flow type of the internal print data is one or two, the internal print data sorting program 37 acquires a print job name as the name of internal print data. In accordance with the internal print data sorting configuration data 38, the internal print data sorting program 37 selects a print data generation program corresponding to the combination of the output flow type of internal print data with the name of internal print data, from among the print data generation program A 39a, the print data generation program B 39b, and the print data generation program C 39c; and executes the thus-selected print data generation program.

The print data generation program converts internal print data (command data of a certain command system) into command data of a command system interpretable for the printer 20, thereby generating print data used for causing the printer 20 to produce a printout of a receipt image. More specifically, the print data generation program interprets internal print data on the basis of the data which are stored in the storage device 12 and used for interpreting command data of various command systems and font data pertaining to fonts which can be specified by the command data of various command systems, thereby generating raster image data pertaining to a receipt image. After having generated raster image data, the print data generation program generates print data (command data of the command system 1) used for causing the printer 20 to produce a printout of the raster image data.

The print data generation program subjects a receipt image to various processing operations. For example, when generating raster image data, the print data generation program changes the font type of the receipt image to another font type. For example, when the receipt image includes a specific keyword, the print data generation program pastes an advertisement image or a coupon image corresponding to the keyword to the bottom of a receipt image. In this case, on the basis of the internal print data, a determination is made as to whether or not the receipt image includes a keyword. An advertisement image, a coupon image, or the like, is pasted to raster image data. For example, the print data generation program pastes a predetermined background image to the background of the receipt image. In this case, the background image is pasted to the raster image data.

As shown in FIG. 4, the print data generation program A 39a is assumed to interpret internal print data of the "command system 2" and perform processing for generating print data of the "command system 1." The print data generation program B 39b is assumed to interpret the internal print data of the "command system 2" and perform processing for generating print data of the "command system 1" while subjecting a receipt image to predetermined processing. The print data generation program C 39c is assumed to interpret internal print data of the "command system 3" and perform processing for generating the print data of the "command system 1."

The print data generated by the print data generation program A 39a, the print data generation program B 39b, or the print data generation program C 39c are output from a port connected to the printer 20 via the port driver 40, and supplied to the printer 20.

As has been described above, in the print system 1, the print data generation program (i.e., the print data generation program A 39a, the print data generation program B 39b, or the print data generation program C 39c) is executed in accordance with the internal print data generated by the printer driver 34a or the internal print data generation programs 34b, 34c, whereby raster image data pertaining to a print target image are temporarily generated. Subsequently, print data used for causing the printer 20 to produce a printout of the raster image data are generated and supplied to the printer 20. Consequently, in the print system 1, even when the printer has been replaced with another printer, print data (RAW data) intended for a pre-replacement printer have been generated as internal print data by the printer driver 34a and the internal print data generation programs 34b, 34c. As a result, a post-replacement printer can produce a printout similar to that produced by the pre-replacement printer without involvement of changes to specifications or settings of the application program.

In the print system 1, the print data generation program (i.e., the print data generation program B 39b) is executed in accordance with the internal print data generated by the printer driver 34a and the internal print data generation programs 34b, 34c, whereby raster image data pertaining to a print target image having undergone processing desired by the user are generated. Subsequently, print data used for causing the printer 20 to produce a printout of the raster image data are generated and supplied to the printer 20. Consequently, in the print system 1, the print target image is subjected to processing desired by the user during the course of generation of a printout, without involvement of changes to specifications or settings of the application program, and a printout of the target image is generated.

Particularly, in the print system 1, the print data generation program used for generating print data from the internal print data can be changed from one internal print data name to another.

For example, when, as in the case of the POS applications 30a and 30b, the name of internal print data changes in the print system 1 as the POS application changes, the print data generation program can be switched according to the name of internal print data. In consequence, a print data generation program can be switched on a per-POS-application basis. Likewise, when the name of internal print data changes according to the type of a receipt image to be printed, the print data generation program can be switched according to the type of a receipt image to be printed.

In order to switch the print data generation program according to a POS application or the type of a receipt image, it is conceived to register in advance a plurality of printer queues corresponding to the printer 20; and to have associated different print data generation programs with the respective printer queues, thereby making a printer queue used for printing a receipt image differ according to the POS application or the type of a receipt image. However, in this case, a plurality of printer queues must be registered. Moreover, when the print data generation program is switched according to the type of a receipt image, the POS application must set a printer queue to be used, according to the type of a receipt image. In this regard, the print system 1 does not need to register a plurality of printer queues. Even when the print data generation program is switched according to the type of the receipt image, the POS application does not need to be set particularly.

In the print system 1, the print data generation program used for generating print data from internal print data can be changed according to the program that has output internal print data to the port driver 40 (the language monitor program 36).

For example, in the print system 1, the print data generation program can be switched according to the output flow type of internal print data, so long as the command system of internal print data changes as a result of the output flow type of internal print data having changed, as in the case of an output flow type "1" and "3." As a result, the print data generation program can be switched according to the command system of the internal print data.

In order to switch the print data generation program in accordance with the command system of the internal print data, consideration is also given to specifying the nature of a command system of command data corresponding to the internal print data by means of making reference to specifics of the internal print data, and executing a print data generation program assigned to the command system. However, when mutually-analogous command systems are present, there may arise a case where complicated processing must be performed, from the viewpoint of specifics of internal print data, in order to specify the nature of a command system of command data corresponding to the internal print data. Primarily, there is a case where difficulty is encountered in specifying the nature of a command system of command data corresponding to the internal print data. In the print system 1, in this respect, even when mutually-analogous command systems are present, switching of a print data generation program in accordance with the command system of the internal print data can be implemented through comparatively-simple processing, so long as internal print data of the command systems are output to the port driver 40 (the language monitor program 36) by way of different programs.

Figure 5:
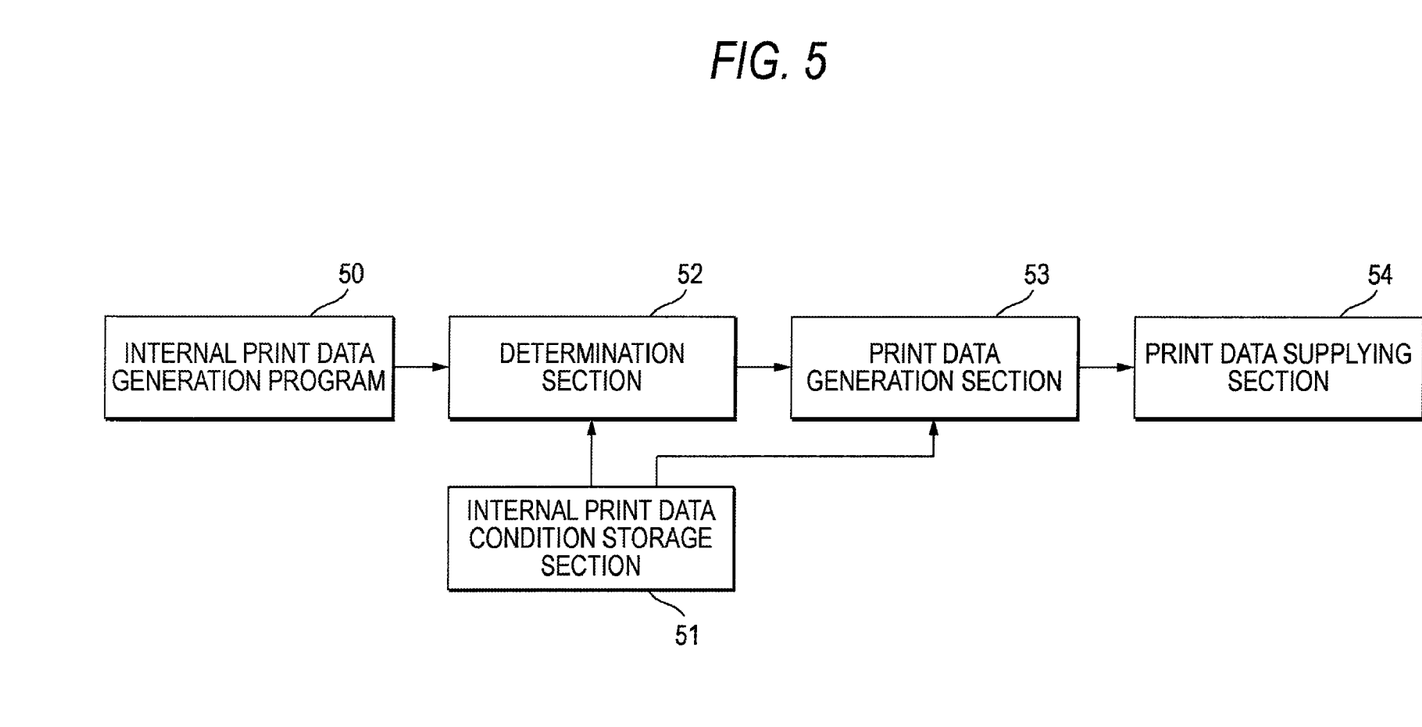
FIG. 5 is a functional block diagram of the host computer of the present embodiment.

Next, a functional configuration of the host computer 10 will be described. FIG. 5 is a functional block diagram primarily showing functional blocks among functional blocks embodied by the host computer 10. As illustrated, the host computer 10 includes an internal print data generation section 50, an internal print data condition storage section 51, a determination section 52, a print data generation section 53, and a print data supplying section 54.

The internal print data generation section 50 performs one data processing operation or a plurality of data processing operations to thus generate internal print data, and outputs the thus-generated internal print data to the determination section 52. The internal print data generation section 50 is embodied as a result of execution of the GDI 31, the printer driver 34a, and the spooler 35. Alternatively, the internal print data generation section 50 is materialized as a result of execution of the internal print data generation program 34b, the spooler API 32, and the spooler 35 or as a result of execution of the internal print data generation program 34c and the port output API 33.

The internal print data condition storage section 51 is embodied mainly by the storage device 12. The internal print data condition storage section 51 stores internal print data conditions pertaining to internal print data, in association with a plurality of print data generation programs (print data generation processing operations), respectively. The internal print data conditions include conditions pertaining to attribute information in the internal print data. More specifically, the internal print data conditions include conditions pertaining to the name of internal print data. Moreover, the internal print data conditions include conditions pertaining to one data processing operation or a plurality of data processing operations used for outputting internal print data. More specifically, the internal print data conditions include, for example, conditions as to whether or not specific processing (e.g., processing relevant to the GDI 31, processing relevant to the spooler API 32, and the like) is included in one data processing operation or a plurality of data processing operations used for outputting internal print data. In the case of the present embodiment, the internal print data condition storage section 51 stores the internal print data sorting configuration data such as that shown in FIG. 4.

The determination section 52 is embodied as a result of the internal print data sorting program 37 being executed by the controller 11. The determination section 52 determines whether or not the internal print data supplied by the internal print data generation section 50 satisfy the internal print data conditions that are stored in the internal print data condition storage section 51 in association with the print data generation program. For example, the determination section 52 acquires attribute information in the internal print data supplied by the internal print data generation section 50, and determines whether or not the attribute information satisfies the internal print data conditions associated with the print data generation program. Moreover, the determination section 52 determines whether or not the one data processing operation or the plurality of data processing operations used for outputting internal print data satisfy the internal print data conditions associated with the print data generation program. Detailed descriptions will be provided later (see FIGS. 6 and 7).

The print data generation section 53 is embodied mainly by the controller 11. On the basis of a result of determination rendered by the determination section 52, the print data generation section 53 selects any one from the plurality of print data generation programs. Specifically, the print data generation section 53 selects, from the plurality of print data generation programs, the print data generation program associated with the internal print data conditions determined, by the determination section 52, to be satisfied. The print data generation section 53 executes the selected print data generation program in accordance with the internal print data generated by the internal print data generation section 50, to thus generate print data.

Figure 6:
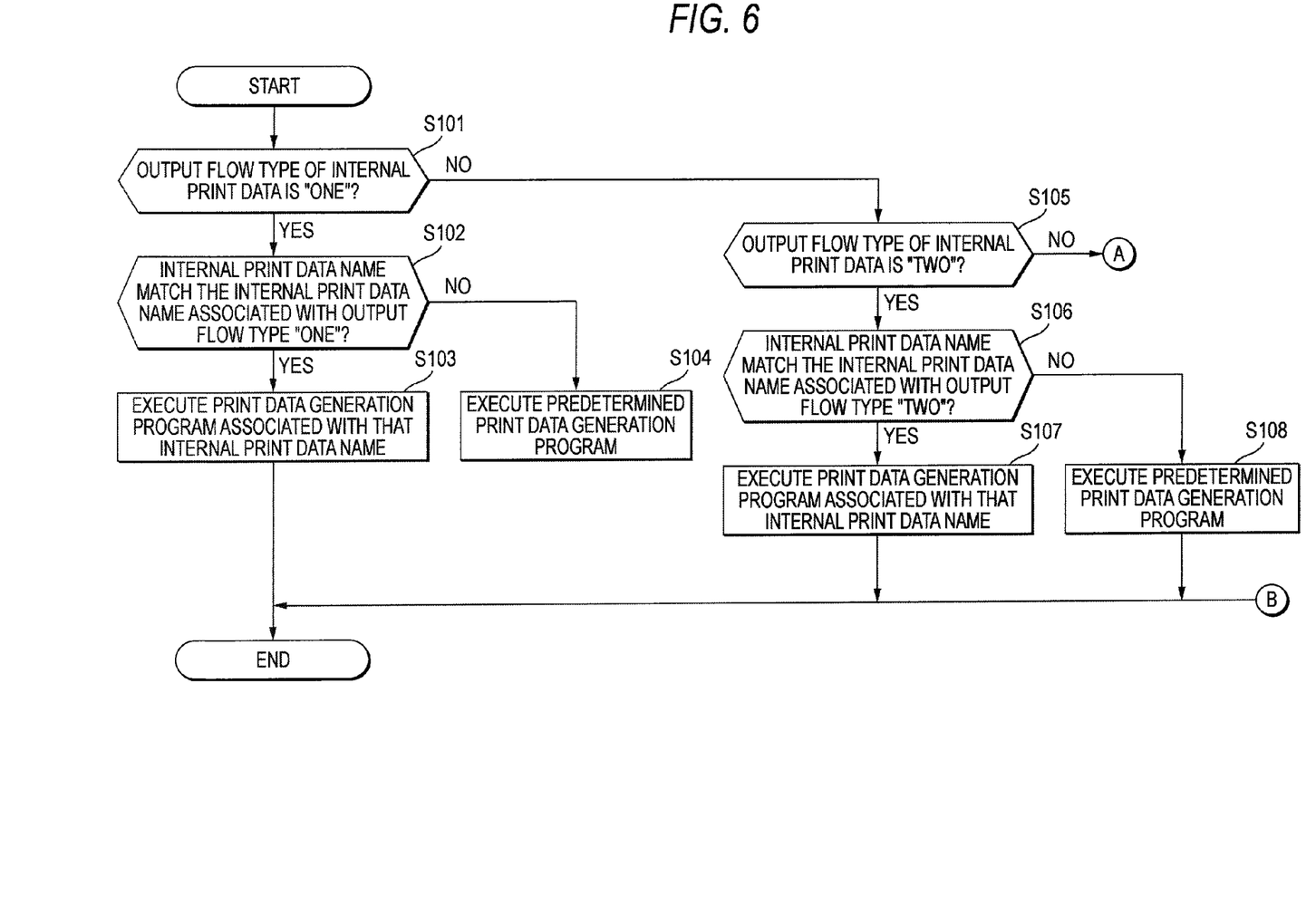
FIG. 6 is a flowchart showing processing performed by the host computer.
Figure 7:
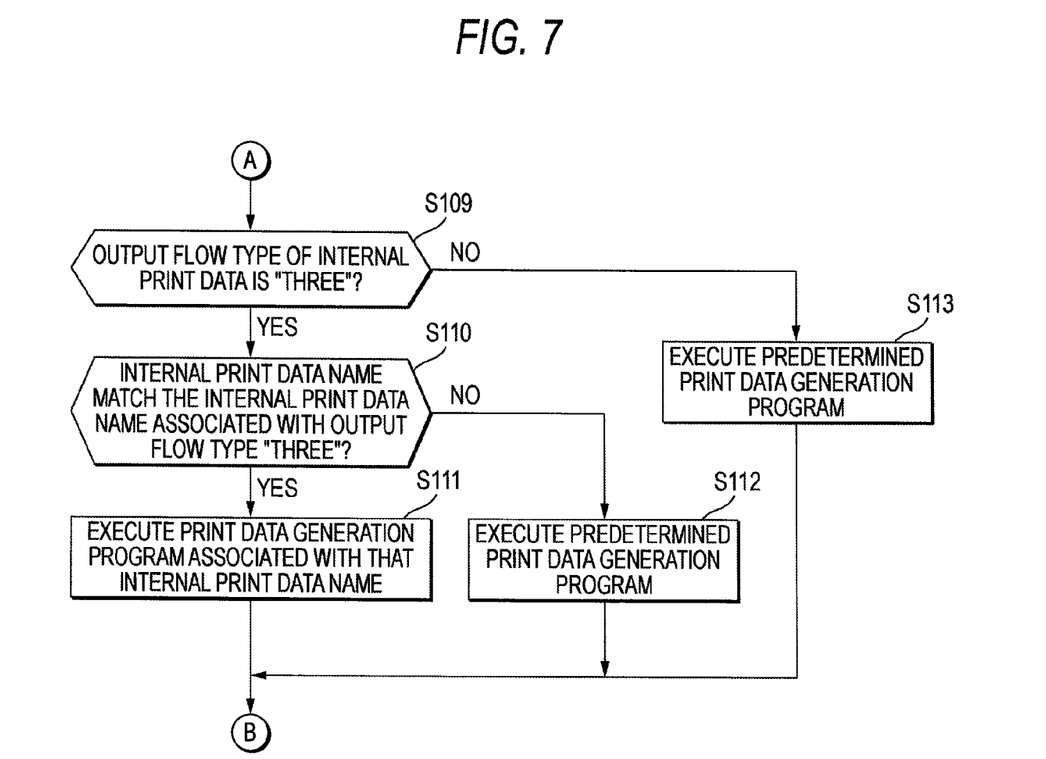
FIG. 7 is a flowchart showing processing performed by the host computer.

Processing mainly performed by the determination section 52 and the print data generation section 53 will be described hereunder. FIGS. 6 and 7 are flowcharts showing processing executed mainly by the determination section 52 and the print data generation section 53. Illustrated processing is realized as a result of the program supplied to the storage device 12 by way of an information storage medium or a communications network being executed by the controller 11.

As shown in FIG. 6, the determination section 52 first determines whether or not the output flow type of the internal print data supplied by the internal print data generation section 50 is "one" (S101). Specifically, a determination is made as to whether or not generation of the internal print data and supply of the internal print data to the port driver 40 (the language monitor program 36) have been performed by way of the GDI 31, the printer driver 34a, and the spooler 35.

The determination is rendered by utilization of a function of the operating system. For example, in the case of Windows manufactured by Microsoft Corporation (Registered Trademark), the name of a function activated during the course of output of internal print data to the port driver 40 (the language monitor program 36) is retained in association with the internal print data (a print job). Accordingly, by utilization of the function, the determination section 52 determines whether or not the function of the GDI 31 has been activated during the course of output of internal print data to the port driver 40 (i.e., the language monitor program 36). When the function of the GDI 31 has been activated, the determination section 52 determines that the internal print data have been output to the port driver 40 (the language monitor program 36) via the GDI 31, the printer driver 34a, and the spooler 35. Specifically, the output flow type of the internal print data is determined to be "one."

When the output flow type of the internal print data has been determined to be "one," the determination section 52 determines which one of the internal print data names assigned to the output flow type "one" matches the internal print data name (S102). In this case, the determination section 52 acquires the name of a print job as an internal print data name. When the internal print data name coincides with any of the internal print data names assigned to the output flow type "one," the print data generation section 53 executes a print data generation program associated with the internal print data name, to thus generate print data (S103). In contrast, when the internal print data name does not match any of the internal print data names assigned to the output flow type "one," the print data generation section 53 executes a predetermined print data generation program, thereby generating print data (S104). In the present embodiment, a standard print data generation program has been previously determined for each output flow type. In this step, the standard print data generation program assigned to the output flow type "one" is executed. Thus, in the present embodiment, when the output flow type of the internal print data is "one," a contrivance is made so as to prevent termination of generation of print data even when the internal print data name of the internal print data does not match any one of the internal print data names assigned to the output flow type "one." The same also applies to a case where the output flow type of internal print data is "two" or "three" (see S108 and S112).

Meanwhile, when having determined that the output flow type of the internal print data is not "one" (when N is selected in S101), the determination section 52 determines whether or not the output flow type of the internal print data is "two" (S105). Specifically, the determination section 52 determines whether or not generation of the internal print data and supply of the internal print data to the port driver 40 (the language monitor program 36) have been performed via the internal print data generation program 34b, the spooler API 32, and the spooler 35. The determination is rendered by means of determining whether or not the function of the spooler API 32 has been activated during the course of output of the internal print data to the port driver 40 (the language monitor program 36).

When the output flow type of the internal print data has been determined to be "two," the determination section 52 determines which one of the internal print data names assigned to the output flow type "two" matches the internal print data name (S106). In this case, the determination section 52 acquires the name of a print job as an internal print data name. When the internal print data name coincides with any of the internal print data names assigned to the output flow type "two," the print data generation section 53 executes a print data generation program associated with the internal print data name, to thus generate print data (S107). In contrast, when the internal print data name does not match any of the internal print data names assigned to the output flow type "two," the print data generation section 53 executes a predetermined print data generation program, thereby generating print data (S108). Specifically, the standard print data generation program associated with the output flow type "two" is executed.

Meanwhile, when having determined that the output flow type of the internal print data is not "two" (when N is selected in S105), the determination section 52 determines whether or not the output flow type of the internal print is "three" (S109). Specifically, the determination section 52 determines whether or not generation of the internal print data and supply of the internal print data to the port driver 40 (the language monitor program 36) have been performed via the internal print data generation program 34*c* and the port output API 33. The determination is rendered by means of determining whether or not the function of the port output API 33 has been activated during the course of output of the internal print data to the port driver 40 (the language monitor program 36). Further, for example, when internal print data are supplied to a virtual COM (serial) port virtually assigned to the USB port, the port output API 33 may determine whether or not the destination where the internal print data are to be supplied is a virtual COM port, to thus determine whether or not the output flow type of internal print data is "three."

When the output flow type of the internal print data has been determined to be "three," the determination section 52 determines which one of the internal print data names assigned to the output flow type "three" matches the internal print data name (S110). When the internal print data name coincides with any of the internal print data names assigned to the output flow type "three," the print data generation section 53 executes a print data generation program associated with the internal print data name, to thus generate print data (S111). In contrast, when the internal print data name does not match any of the internal print data names assigned to the output flow type "three," the print data generation section 53 executes a predetermined print data generation program, thereby generating print data (S112). Specifically, the standard print data generation program assigned to the output flow type "three" is executed.

When in S109 the output flow type of the internal print data has been determined not to be "three" (when N is selected in S109), the print data generation section 53 performs a predetermined print data generation program, thereby generating print data (S113). In the present embodiment, the standard print data generation program of the print system 1 has been determined in advance. In this step, that print data generation program is executed. Thus, in the present embodiment, even when the output flow type of internal print data does not correspond to any of "1," "2," and "3," contrivance is made to prevent termination of generation of print data.

The print data supplying section 54 is embodied mainly by the controller 11. The print data supplying section 54 supplies the printer 20 with the print data generated by the print data generation section 53.

The printer 20 receives the print data supplied by the print data supplying section 54, and performs formation of a receipt image on an image recording medium, cutting of the image recording medium, and the like, in accordance with the print data.

As has been described above, in the print system 1, even when the printer has been replaced with another printer, print data (RAW data) intended for a pre-replacement printer have been generated as internal print data by the printer driver 34*a* and the internal print data generation programs 34*b*, 34*c*. As a result, a post-replacement printer can produce a printout similar to that produced by the pre-replacement printer without involvement of changes to specifications or settings of the application program. Moreover, in the print system 1, the print target image is subjected to processing desired by the user during the course of generation of a printout, without involvement of changes to specifications or settings of the application program, and a printout of the target image is generated.

Particularly, the print system 1 enables a print data generation program (i.e., specifics of print data generation processing) used for generating print data from internal print data to change from one internal print data name to another internal print data name. Further, in the print system 1, the print data generation program used for generating print data can be made different in accordance with the nature of the program by means of which internal print data have been output to the port driver 40 (the language monitor program 36). Consequently, for example, the print system 1 can make the print data generation program different in accordance with a POS application or the type of a receipt image or can make the print data generation program different in accordance with the command system of internal print data, by means of a comparatively simple configuration.

The present invention is not limited to the embodiments described above.

For example, the operating system executed by the host computer 10 is not limited to Windows (Registered Trademark) manufactured by Microsoft Corporation. Moreover, the application programs executed by the host computer 10 are not limited to the POS applications 30*a*, 30*b*. In other words, objects to be printed by the printer 20 are not limited to receipt images generated by the POS applications 30*a*, 30*b* and may also be a document, an image, or the like, generated by another application program.

Further, the host computer 10 and the printer 20 have been described as being connected together by way of the USB interface. However, the host computer 10 and the printer 20 may also be connected together through communication via a communications network such as an LAN (Local Area Network) or the like. In this case, the essential requirement is to form the interfaces 15 and 24 as communications interfaces used for establishing a connection with the communications network.

For example, a program (e.g., a port emulator or the like) given a designation other than "language monitor program" may be used in lieu of the language monitor program 36.

The foregoing description of the embodiment has been presented for purposes of illustration and description. It is not intended to be exhaustive or to limit the invention to the precise form disclosed, and modifications and variations are possible in light of the above teachings or may be obtained from practice of the invention. The embodiment was chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A print system comprising:
a first printer that performs printing on a sheet; and
a print data supplying device that supplies the first printer with print data,
wherein the print data supplying device comprises:
an internal print data generation unit that performs one data processing operation or a plurality of data processing operations to generate internal print data corresponding to a second printer that is different from the first printer;
a print data generation unit that generates print data corresponding to the first printer from the internal print data corresponding to the second printer by performing a print data generation processing operation in accordance with the internal print data that is generated by the internal print data generation unit;
a print data supplying unit that supplies the first printer with the print data generated by the print data generation unit;
an internal print data condition storage unit that stores a plurality of internal print data conditions in association with the respective print data generation processing operations, the internal print data conditions pertaining to the internal print data; and
a determination unit that determines whether or not the internal print data satisfies the internal print data conditions that are associated with the print data generation processing operations,
wherein the print data generation unit selects one of a plurality of print data generation processing operations that are each specific to the first printer for generating print data corresponding to the first printer, and performs the one of the plurality of print data generation processing operations selected in accordance with the result of the determination made by the determination unit, and generates the print data corresponding to the first printer.

2. The print system according to claim 1, wherein the internal print data conditions include conditions pertaining to attribute information of the internal print data, and
wherein the determination unit determines whether or not the attribute information of the internal print data satisfies the internal print data conditions that are associated with the print data generating processing operations.

3. The print system according to claim 1, wherein the internal print data conditions include conditions pertaining to the data processing operation, and
wherein the determination unit determines whether or not the one data processing operation or the plurality of data processing operations used for outputting the internal print data satisfies the internal print data conditions that are associated with the print data generating processing operations.

4. The print system according to claim 2, wherein the internal print data conditions include conditions pertaining to the data processing operation, and
wherein the determination unit determines whether or not the one data processing operation or the plurality of data processing operations used for outputting the internal print data satisfies the internal print data conditions that are associated with the print data generating processing operations.

5. The print system according to claim 1, wherein when determined that the internal print data satisfies any of the internal print data conditions that are respectively associated with the plurality of print data generating processing operations, the print data generation unit performs the print data generation processing operation that is associated with the satisfied internal print data condition, and
wherein when determined that the internal print data satisfies none of the internal print data conditions that are respectively associated with the plurality of print data generation processing operations, the print data generation unit performs a predetermined print data generation processing operation.

6. The print system according to claim 2, wherein when determined that the internal print data satisfies any of the internal print data conditions that are respectively associated with the plurality of print data generating processing operations, the print data generation unit performs the print data generation processing operation that is associated with the satisfied internal print data condition, and
wherein when determined that the internal print data satisfies none of the internal print data conditions that are respectively associated with the plurality of print data generation processing operations, the print data generation unit performs a predetermined print data generation processing operation.

7. The print system according to claim 3, wherein when determined that the internal print data satisfies any of the internal print data conditions that are respectively associated with the plurality of print data generating processing operations, the print data generation unit performs the print data generation processing operation that is associated with the satisfied internal print data condition, and
wherein when determined that the internal print data satisfies none of the internal print data conditions that are respectively associated with the plurality of print data generation processing operations, the print data generation unit performs a predetermined print data generation processing operation.

8. The print system according to claim 4, wherein when determined that the internal print data satisfies any of the internal print data conditions that are respectively associated with the plurality of print data generating processing operations, the print data generation unit performs the print data generation processing operation that is associated with the satisfied internal print data condition, and
wherein when determined that the internal print data satisfies none of the internal print data conditions that are respectively associated with the plurality of print data generation processing operations, the print data generation unit performs a predetermined print data generation processing operation.

9. A method for supplying a print data to a first printer, the method comprising:
generating internal print data corresponding to a second printer that is different from the first printer by performing one data processing operation or a plurality of data processing operations;
storing a plurality of internal print data conditions in association with each of the print data generation processing operations, the internal print data conditions pertaining to the internal print data;
determining whether or not the internal print data satisfies any one of the internal print data conditions;
selecting one of a plurality of print data generation processing operations that are specific to the first printer for generating print data corresponding to the first printer;
generating the print data corresponding to the first printer from the internal print data corresponding to the second printer by performing the one of the print data generation processing operations selected for generating print data used for causing the first printer to perform printing, in accordance with internal print data that is output as a result of the determination; and
supplying the generated print data to the first printer.

10. A non transitory computer-readable program product for causing a system to perform a process for supplying a print data to a first printer, the process comprising:
- generating internal print data corresponding to a second printer that is different from the first printer by performing one data processing operation or a plurality of data processing operations;
- storing a plurality of internal print data conditions in association with each of the print data generation processing operations, the internal print data conditions pertaining to the internal print data;
- determining whether or not the internal print data satisfies any one of the internal print data conditions;
- selecting one of a plurality of print data generation processing operations that are specific to the first printer for generating print data corresponding to the first printer;
- generating the print data corresponding to the first printer from the internal print data corresponding to the second printer by performing the one of the print data generation processing operations selected for generating print data used for causing the first printer to perform printing, in accordance with internal print data that is output as a result of the determination; and
- supplying the generated print data to the first printer.

* * * * *